Patented Feb. 12, 1952

2,585,877

UNITED STATES PATENT OFFICE 2,585,877

LUBRICATING OIL COMPOSITION

Hastings S. Trigg, West Hempstead, N. Y., and Henry D. Norris, Woodbury, and Ralph V. White, Pitman, N. J., assignors to Socony-Vacuum Oil Company, Incorporated, a corporation of New York No Drawing. Application April 21, 1949, Serial No. 88,906

11 Claims. (Cl. 252—34)

This invention relates to lubricants, and it is more particularly concerned with mineral lubricating oils containing reaction products obtained by reacting a trialkylamine, an oxyaliphatic dicarboxylic acid, and a primary, aliphatic, monohydric alcohol.

As is well known to those familiar with the art, rusting of ferrous metal surfaces is frequently encountered during the operation of steam turbines, particularly during the initial operation of new installations. Such rusting is most pronounced at points where the clearance between bearing surfaces is very small, such as in the governor mechanism. Manifestly, this constitutes a menace to the operational life of the turbine. When rusting is very severe, particles of rust may form on the main bearing surfaces, or be carried there by the circulating oil, and severely injure these bearings. This is usually caused by water entering the oil supply, as by condensation, and becoming entrained by the oil throughout the circulating system, thereby coming into contact with ferrous metal surfaces.

It is also well known that, in many instances, oils used in cutting and threading operation are lacking in one or more characteristics. Rusting is frequently a problem, but, in addition, it is desirable to use a cutting oil which has good antiwear properties.

Many materials have been proposed as addition agents for lubricating oils to prevent rusting and to impart antiwear characteristics to the oils. Certain esters and monoesters have been proposed for these purposes, but insofar as is now known, the use for this purpose of ester reaction products obtained by reacting a trialkylamine, an oxy-aliphatic dicarboxylic acid, and a primary, aliphatic, monohydric alcohol has not been suggested.

In a copending application, Serial No. 74,242, filed February 2, 1949, by the present inventors, there was discolsed the preparation of ester reaction products obtained by reacting a trialkylamine, a dicarboxylic acid which does not form an anhydride, and a primary, aliphatic, monohydric alcohol. It has now been found that mineral lubricating oils containing minor amounts of members of a specific class of these ester reaction products possess remarkably improved characteristics. More specifically, it has been discovered that mineral lubricating oils containing minor amounts of ester reaction products obtained by reacting a trialkylamine, an oxy-aliphatic dicarboxylic acid, and a primary, aliphatic, monohydric alcohol having at least 12 carbon atoms per molecule, have good antirust properties and improved antiwear characteristics.

Accordingly, it is a broad object of the present invention to provide an improved lubricant. Another object is to provide a mineral lubricating oil containing a small amount of members of a specific class of ester reaction products obtained by reacting a trialkylamine, a dicarboxylic acid which does not form an anhydride readily, and a primary, aliphatic, monohydric alcohol. A further object is to provide an improved mineral lubricating oil containing a minor proportion of a trialkylamine-oxy-aliphatic dicarboxylic acid-primary, aliphatic, monohydric alcohol ester reaction product. An important object is to provide an improved cutting oil containing a small amount of a trialkylamine-oxy-aliphatic dicarboxylic acid-primary, aliphatic monohydric alcohol ester reaction product. A specific object is to provide an improved mineral lubricating oil containing a minor proportion of an ester reaction product obtained by reacting a trialkylamine with an oxy-aliphatic dicarboxylic acid to produce a trialkylammonium acid salt, and esterifying the trialkylammonium acid salt with a primary, aliphatic, monohydric alcohol containing at least 12 carbon atoms per molecule. Other objects and advantages of the present invention will become apparent to those skilled in the art from the following detailed description.

Broadly stated, the present invention provides a mineral lubricating oil containing a minor proportion, sufficient to prevent rusting of ferrous metal surfaces, of an ester reaction product obtained by reacting a trialkylamine with an oxy-aliphatic dicarboxylic acid, in a molar ratio of at least one mol of trialkylamine per mol of acid, to produce a trialkylammonium acid salt of said dicarboxylic acid, and esterifying said trialkylammonium acid salt of said dicarboxylic acid with a primary, aliphatic, monohydric alcohol containing at least 12 carbon atoms per molecule, in a molar ratio about 1:1, respectively.

The oxy-aliphatic dicarboxylic acid reactants utilizable herein are the dicarboxylic acids of the aliphatic series having at least one hydroxyl group attached to a carbon atom other than a carbon atom which forms part of a carboxyl group. It is to be understood that these acids may contain other substituents in addition to the hydroxyl group, such as halogen atoms or nitro groups. Non-limiting examples of the oxy-aliphatic dicarboxylic acid reactant are hydroxy malonic acid; mesoxalic acid; malic acid; tartaric acid; α-hydroxyglutaric acid; β-hydroxyglutaric acid; trihydroxyglutaric acid; mucic acid; allomucic acid; and talomucic acid. The preferred oxy-aliphatic dicarboxylic acid reactants are malic acid and tartaric acid.

The preparation of the additives of the present invention proceeds readily at normal temperatures and at atmospheric pressure with dicarboxylic acid reactants which have melting points lower than about 200° C. In order to achieve a commercially feasible process in the case of dicarboxylic acid reactants having melting points higher than about 200° C., resort must be made to special equipment, such as pressure equipment, and temperatures sufficiently high to melt the acid reactant. Acid reactants which have melting points higher than about 200° C. include mucic acid in the aliphatic series. Accordingly, it will be appreciated that the process of producing the additives of the present invention is generally applicable to all the acid reactants described hereinbefore, but the preferred reactants are the oxy-aliphatic dicarboxylic acids having fewer than six hydroxyl groups, excluding the hydroxyl groups which form part of the carboxyl groups.

The tertiary amine reactants to be used herein are, preferably, the trialkylamines having up to six carbon atoms per alkyl radical. The alkyl radicals may be straight-chain or branched-chain. The three alkyl radicals in the amine reactant may be the same or they may be different, i. e., a combination of branched and straight chains and/or radicals of different chain lengths. Non-limiting examples of the trialkylamine reactant are trimethylamine, triethylamine, triisopropylamine, tripropylamine, tri-n-butylamine, triisobutylamine, triamylamine, triisoamylamine, trihexylamine, methyldiethylamine, dimethylamylamine, dimethylisopropylamine, dibutylamylamine, and dimethylhexylamine. The amine reactant may be a pure compound, or it may be in admixture with other materials which do not react with acids, such as hydrocarbons. It is also within the concept of the present invention to use mixtures containing two or more different amine reactants.

The amine reactant and the dicarboxylic acid reactant react with each other in about equimolar proportions. This reaction is selective to the extent that only one mol of amine reactant will react with a mol of dicarboxylic acid, forming the trialkylammonium salt of one carboxyl group and leaving the other carboxyl group free for esterification purposes. Accordingly, at least one mol of amine should be reacted with each mol of dicarboxylic acid reactant. More than one mol of amine may be used if desired, but only about one mol will be involved in the reaction. Use of less than one mol of amine reactant will result in only partial reaction. For obvious reasons, this is not desirable.

The selective action is demonstrated by the following illustrative examples:

EXAMPLE 1

A mixture containing 13.4 grams (0.1 mol) of malic acid and 18.5 grams (0.1 mol) of tri-n-butylamine was stirred and heated at a temperature of 110° C. for about 1½ hours. Upon standing and cooling, a clear, homogeneous, syrupy liquid product was obtained, and no unreacted maleic acid or amine was detected. This product readily underwent esterification reactions.

EXAMPLE 2

A mixture containing 13.4 grams (0.1 mol) of maleic acid and 37.0 grams (0.2 mol) of tri-n-butylamine was stirred and heated at a temperature of 110° C. for about two hours. Upon standing and cooling, two liquid layers were obtained. The supernatant layer was removed and weighed. It was found to be tri-n-butylamine in an amount equivalent to 0.1 mol. The product in the other layer proved to be identical with the product obtained in Example 1. This run clearly demonstrates that only one mol of trialkylamine will react with a mol of dicarboxylic acid to form the corresponding trialkylammonium salt, i. e., an attempt to neutralize a dicarboxylic acid with a trialkylamine will yield only the acid trialkylammonium salt having one free carboxyl group.

The temperature of the reaction between the amine reactant and the acid reactant is a variable, and not too critical, factor. Usually, the reaction proceeds readily at temperatures varying between about 80° C. and about 120° C. It is not desirable to exceed the temperature of 120° C. in the case of acids, such as malic and malonic acids, which are not very stable when heated. However, when relatively more stable acids, such as mucic acid, are used, the temperature of reaction may be as high as that corresponding to the melting point of the acid reactant. At temperatures lower than about 80° C. the addition reaction does not proceed readily. Accordingly, the reaction temperature should be at least about 80° C. and, preferably, it will vary between about 80° C. and about 120° C.

The addition reaction involving the amine reactant and the acid reactant occurs quickly at the reaction temperature. Accordingly, the time of reaction is not a critical factor. It may vary from a few minutes to several hours, depending on the reactants involved and the temperature selected. As is common in many chemical reactions, the time of reaction varies directly with the temperature, longer times being needed at lower reaction temperatures, and vice versa.

In order to produce ester reaction products suitable for use in mineral lubricating oils, the primary, aliphatic, monohydric alcohol reactant must contain at least twelve carbon atoms, and preferably between about twelve and about eighteen carbon atoms, per molecule. These alcohols may be straight-chain or branched-chain alcohols, and they may be saturated or unsaturated. Non-limiting examples of the alcohol reactant are dodecanol-1; tetradecanol-1; hexadecanol-1; octadecanol-1; oleyl alcohol; linoleyl alcohol; linolenyl alcohol; phytol; and myricyl alcohol.

The trialkylammonium acid salt of the oxy-aliphatic dicarboxylic acid reactant, prepared as set forth hereinbefore, is esterified by reacting the salt and the alcohol in about equimolar proportions. In accordance with the law of mass action, a slight molar excess of the alcohol reactant may be used, if desired, to ensure more complete esterification. Large excesses of the alcohol reactant, however, serve no useful purpose.

The temperature of esterification is not too critical a factor. In general, the reaction temperature will vary between about 100° C. and about 150° C., and, preferably, between about 115° C. and about 135° C. Temperatures below 100° C. may be used but, at these temperatures, the rate of esterification is usually too slow. Likewise, temperatures above about 150° C. may be employed provided that the reactants are not decomposed.

The esterification reaction is carried out until practically all of the water of esterification which will be evolved theoretically to achieve complete esterification has been removed, i. e., until essentially one mol of water has been evolved for each mol of acid trialkylammonium salt of the oxy-aliphatic dicarboxylic acid reactant. It will be appreciated that it is practically impossible to obtain all of the water of esterification theoretically possible, but the amount not evolved will be negligible. Therefore, the duration of the esterification reaction will vary with the temperature and with the particular reactants employed, and it will vary, generally, between about four hours and about ten hours.

In order to facilitate the removal of the water of esterification, a hydrocarbon solvent which forms an azeotropic mixture with water is added to the reaction mixture, and heating is continued with the liquid reaction mixture at the preferred reaction temperature, until essentially all of the water of esterification has been removed by azeotropic distillation. In general, any hydrocarbon solvent which forms an azeotropic mixture with water can be used in the present process. It is preferred, however, to use an aromatic hydrocarbon solvent of the benzene series. Non-limiting examples of the preferred solvent are benzene, toluene, and xylene. As will be readily appreciated by those skilled in the art, the amount of solvent used is a variable and non-critical factor, and it is dependent on the size of the reaction vessel and the reaction temperature selected. Accordingly, a sufficient amount of solvent must be used to support the azeotropic distillation, but a large excess must be avoided since the reaction temperature will be lowered thereby.

The separation of the reaction product is accomplished by removing the solvent and filtering the remaining residue. The solvent is removed, preferably, by distilling it out of the reaction mixture under reduced pressure. The temperature of distillation is not too critical and it is a function of the pressure. In no case, however, should the temperature used for solvent removal exceed the highest temperature employed during the reaction. It has been found advantageous to use a relatively low vacuum at a temperature of about 100° C. No special precautions must be taken during the distillation operation to effect the distillation of the amine reactant since it has been found that the amine is firmly combined in the ester reaction product.

Non-limiting examples of the ester reaction products, which can be prepared as described herein, and which are utilizable in the mineral lubricating oil compositions of the present invention, are those prepared from trimethylamine-mesoxalic acid - dodecanol - 1; dimethylhexylamine-mesoxalic acid-linolenyl alcohol; tributylamine-mesoxalic acid-myricyl alcohol; dimethylisopropylamine - hydroxymalonic acid-tetradecanol-1; triisoamylamine - hydroxymalonic acid-linoleyl alcohol; triethylamine - hydroxymalonic acid - phytol; dimethylhexylamine - malic acid - hexadecanol-1; tri-n-butylamine-malic acid-oleyl alcohol; methyldiethylamine-malic acid-myricyl alcohol; triamylamine-tartaric acid-dodecanol-1; tripropylamine - tartaric acid - linoleyl alcohol; dibutylamylamine - tartaric acid-octadecanol-1; tributylamine-α-hydroxyglutaric acid-tetradecanol-1; dimethylisopropylamine - α - hydroxyglutaric acid-linolenyl alcohol; triisoamylamine-α-hydroxyglutaric acid - phytol; trimethylamine-talomucic acid-hexadecanol-1; dimethyl-hexylamine-talomucic acid-oleyl alcohol; and tri-n-butylamine-talomucic acid-octadecanol-1.

The ester reaction products of the present invention are blended in the lubricating oil in concentrations varying between about 0.02 per cent and about 10 per cent, by volume, depending on the particular use contemplated. It is preferred to use concentrations varying between about 0.02 per cent and about 0.25 per cent for purposes of protection against rusting of ferrous metal surfaces. When using the additive in cutting oils, concentrations varying between about 0.25 per cent and about 10 per cent are usually used.

The following specific examples are for the purpose of illustrating the mode of preparing the ester reaction products of the present invention, and for the purpose of demonstrating the superiority of lubricating oils containing these ester reaction products. It must be strictly understood, however, that the invention is not to be limited to the specific reactants set forth hereinafter, or to the operations and manipulations described therein. As will be apparent to those skilled in the art, a wide variety of other reactants, as set forth hereinbefore, may be used to prepare the products contemplated herein.

Example 3

In a flask provided with a reflux condenser, water trap, thermometer, and stirrer, 134 grams (1.0 mol) of malic acid and 185 grams (1.0 mol) of tri-n-butylamine were heated at about 95° C. until a clear, viscous solution was obtained. Then, 268 grams (1.0 mol) of oleyl alcohol were added, and the reaction mixture was heated to 115° C. Benzene was added to the reaction vessel and heating was adjusted so that reflux of benzene-water azeotrope took place with the flask contents at 115° C. After 14 hours, when 19 cubic centimeters of water had passed through the reflux condenser and had been collected in the water trap which was positioned at its outlet, the reaction was stopped. The product was filtered, and the vehicle (benzene) was removed by vacuum distillation at about 40 millimeters, over a boiling-water bath. The ester reaction product was a clear, amber colored liquid containing 2.06% nitrogen. It had a neutralization number (number mg. KOH equivalent to one gram of product) of 103.0. Pertinent test data for this product are set forth in Table I.

Example 4

In a flask provided with a reflux condenser, water trap, stirrer and thermometer, 134 grams (1.0 mol) of malic acid and 227 grams (1.0 mol) of triamylamine (mixed isomers) were stirred and heated at 100° C. to form triamylammonium acid malate. Then, 268 grams (1.0 mol) of oleyl alcohol were added, and the reaction mixture was heated to 115° C. Benzene was added and the heating continued so that the benzene refluxed at a reaction temperature of 115° C. After 8 hours, at which time 18 cubic centimeters of water had been collected, the reaction was stopped, the product filtered, and the benzene removed as before. The ester reaction product was a straw-colored liquid having a neutralization number of 108.0. Pertinent test data are set forth in Table I.

Example 5

An ester reaction product was prepared from equimolar amounts of triamylamine, malic acid, and oleyl alcohol in the manner set forth in Example 4, with the exception that esterification was effected at about 135° C., in about four hours. This product had a neutralization number of 103.4. Pertinent test data are set forth in Table I.

Example 6

An ester reaction product was prepared in the manner set forth in Example 4, using equimolar amounts of tri-n-butylamine, malic acid, and octadecanol-1. The product had a neutralization number of 99.7. Test data are set forth in Table I.

Example 7

An ester reaction product was prepared in the manner set forth in Example 3, using equimolar amounts of tri-n-butylamine, malic acid, and hexadecanol-1, with the exception that esterification was effected at about 135° C. in about four and one-quarter hours. This product had a neutralization number of 122.4. Pertinent test data appear in Table I.

*Example 8*

An ester reaction product using equimolar amounts of tri-n-butylamine, malic acid, and dodecanol-1, in the manner set forth in Example 3. The product had a neutralization number of 141.2. Pertinent test data are given in Table I.

*Example 9*

An ester reaction product was prepared in the manner described in Example 4, using equimolar amounts of triamylamine, malic acid, and 2-ethylhexanol-1. This product had a neutralization number of 167.4. Test data are set forth in Table II.

*Example 10*

An ester reaction product was prepared in the manner described in Example 4, using equimolar amounts of triamylamine, tartaric acid, and oleyl alcohol. Pertinent test data are set forth in Table I.

*Example 11*

For comparison purposes, an ester reaction product was prepared in the manner described in Example 4, using equimolar amounts of triamylamine succinic acid, and oleyl alcohol. Pertinent test data for this product are set forth in Table II.

*Example 12*

An ester reaction product was prepared in the manner described in Example 4, using equimolar amounts of triamylamine, adipic acid, and oleyl alcohol. This product had a neutralization number of 111,2. Pertinent test data are set forth in Table II.

To demonstrate the outstanding characteristics of mineral oil compositions containing the trialkylamine-oxy-aliphatic dicarboxylic acid-primary aliphatic, monohydric alcohol reaction products contemplated herein, typical rust test data and emulsion test data were obtained for mineral oil blends containing the reaction products described in the examples. The oil used for test purposes was a blend of solvent-refined, Mid-Continent residual stock with a solvent-refined, Mid-Continent Rodessa distillate stock. It had an A. P. I. gravity of 30.8, a flash point of 445° F., and a Saybolt Universal viscosity of 407.7 seconds at 100° F. This oil was blended with 0.2 per cent of 2,6-di-t-butyl-4-methylphenol and 0.1 per cent of phenyl-α-naphthylamine, well-known anti-oxidants for lubricating oils. This oil is suitable for use in steam turbines and the like. Tests on the oil and oil blends simulate conditions existing in turbine operations and analogous operations.

The test method used to establish the rusting characteristics of lubricating oil blends is the ASTM Test D665-44T, "Rust Preventing Characteristics of Steam Turbine Oil in Presence of Water." In this test, synthetic sea water as well as distilled water is used. The synthetic sea water contains 25 grams sodium chloride, 11 grams magnesium chloride hexahydrate, 4 grams sodium sulfate, and 1.2 grams calcium chloride per liter. In this test, a cylindrical, polished steel specimen is suspended in 300 cubic centimeters of the oil under test, at 140° F., and for thirty minutes. Then, 30 cubic centimeters of synthetic sea water (or 30 cubic centimeters of distilled water) are added, and the mixture is stirred at 1000 R. P. M. After 48 hours, the steel specimen is removed and examined for evidence of rusting. The oil passes the test when there is no rust on that part of the specimen which is submerged in the oil.

The emulsion test used was the emulsion test for lubricating oils (method 320.13) described in the Federal Stock Catalog, section IV, part 5, Federal Specifications VV-L-791 b, February 19, 1942. In this test, 40 cubic centimeters of oil and 40 cubic centimeters of emulsant, either distilled water or a one per cent aqueous solution of sodium chloride, are stirred with a paddle at 1500 R. P. M., for 5 minutes, in a 100-cubic centimeter cylinder, at a temperature of 130° F. Separation of the emulsion formed is observed while the cylinder is kept at 130° F., for a specified time interval. Figures given in the tables are the number of minutes which elapse before there is no continuous layer of emulsion between the oil and the emulsant. With an oil having the viscosity characteristics of the oil used in the tests, the specifications require that there be no continuous layer of emulsion at the interface after a 30-minute period.

TABLE I

*Reaction products effective in lubricating oil*

| Product | Conc. in Oil, Per cent | ASTM Rust Test Results | | Emulsion Test— | |
|---|---|---|---|---|---|
| | | Syn. Sea Water | Distilled Water | Break, Dist. Water | Min., 1% NaCl |
| Ex. 3 | 0.1 | pass | pass | 20 | 15 |
| | 0.075 | do | | | |
| | 0.05 | fail | pass | 18 | 13 |
| | 0.02 | | fail | 17 | 20 |
| Ex. 4 | 0.1 | pass | pass | 20 | 27 |
| | 0.05 | fail | do | 13 | 23 |
| Ex. 5 | 0.1 | pass | | 18 | 30 |
| | 0.05 | fail | | 12 | 18 |
| Ex. 6 | 0.2 | pass | | | |
| | 0.1 | do | | 20 | 24 |
| | 0.05 | fail | | | |
| Ex. 7 | 0.25 | pass | | | |
| | 0.1 | do | pass | 14 | 15 |
| | 0.05 | | do | | |
| | 0.02 | | fail | | |
| Ex. 8 | 0.1 | fail | pass | 13 | 13 |
| | 0.05 | | do | | |
| | 0.02 | | fail | | |
| Ex. 10 | 0.1 | pass | pass | 2 | 30 |
| | 0.05 | | fail | | |
| Base oil | | (¹) | (¹) | 2 | 1 |

¹ Severe rust in 12 hrs.

TABLE II

*Reaction products not effective in lubricating oil*

| Product | Conc. in Oil, Per cent | ASTM Rust Test Results | | Emulsion Test— | |
|---|---|---|---|---|---|
| | | Syn. Sea Water | Distilled Water | Break, Dist. Water | min., 1% NaCl |
| Ex. 9 | 0.1 | fail | fail | 2 | 5 |
| 11 | 0.1 | do | do | 5 | 6 |
| 12 | 0.1 | do | do | 6 | 4 |

It will be apparent from a comparison of the test data set forth in Tables I and II, that (1) oil compositions containing reaction products of a trialkylamine, an oxy-aliphatic dicarboxylic acid, and a primary aliphatic, monohydric alcohol, prepared in accordance with the present invention, have good antirust properties and good emulsion characteristics, and (2) the aliphatic, monohydric alcohol reactant used must have at least about 12 carbon atoms per molecule.

As is well known to those skilled in the art, other additives may be added to the lubricating oil in addition to the antirust additive of the present invention. These other additives are added to impart to the oil greater resistance to oxidation, greater film strength, etc.

Cutting oils, per se, have poor antiwear properties and cutting efficiencies. For purposes of comparison, a blend of one per cent of the reaction product of Example 4 in a typical commercial cutting oil was prepared and tested. The cutting oil was a sulfurized mineral oil having an A. P. I. gravity of 24, a flash point of 350° F., and a Saybolt Universal viscosity of 150–165 seconds at 100° F. The test data are set forth in Table III. It is to be noted that a marked improvement in the antiwear properties and in the cutting efficiency of the oil was imparted through the addition of one per cent of a product of the present invention.

TABLE III

*Properties of triamylamine-malic acid-oleyl alcohol reaction product in cutting oil*

| Blend | Tapping Efficiency, per cent | Oster Threading Efficiency, per cent | Falex Wear Test, Mg. Loss |
|---|---|---|---|
| 1% Reaction Product | 95 | 94 | 3.5 |
| Base Oil | 89 | 88 | 13.0 |

Mineral oil concentrates are also contemplated herein, such concentrates containing substantially larger amounts of the ester product than set forth hereinbefore. Thus, relatively large amounts, i. e., upwards of about 10 per cent and up to about 49 per cent by weight of the ester product, may be incorporated in a mineral oil. The oil concentrate thus obtained may thereafter be diluted with a suitable quantity of mineral oil prior to use, to produce a mineral oil containing the desired optimum concentration of ester product.

Although the present invention has been described with preferred embodiments, it is to be understood that modifications and variations may be resorted to without departing from the spirit and scope of this invention, as those skilled in the art will readily understand. Such variations and modifications are considered to be within the purview and scope of the appended claims.

We claim:

1. A mineral oil containing a minor amount, sufficient to improve the antiwear properties and the cutting efficiencies thereof, of an ester of a trialkylammonium acid salt of a hydroxy aliphatic dicarboxylic acid and a primary, aliphatic, monohydric alcohol containing between about 12 carbon atoms and about 31 carbon atoms per molecule; the alkyl radicals in the trialkylammonium group of said trialkylammonium salt containing up to six carbon atoms per radical.

2. A mineral oil containing between about 0.02 per cent and about 10 per cent, by weight, of an ester of a trialkylammonium acid salt of a hydroxy aliphatic dicarboxylic acid and a primary, aliphatic, monohydric alcohol containing between about 12 carbon atoms and about 18 carbon atoms per molecule; the alkyl radicals in the trialkylammonium group of said trialkylammonium salt containing up to six carbon atoms per radical.

3. A mineral oil containing a minor amount, sufficient to improve the antiwear properties and the cutting efficiencies thereof, of an ester of a trialkylammonium acid salt of malic acid and a primary, aliphatic, monohydric alcohol containing between about 12 carbon atoms and about 18 carbon atoms per molecule; the alkyl radicals in the trialkylammonium group of said trialkylammonium salt containing up to six carbon atoms per radical.

4. A mineral oil containing a minor amount, sufficient to improve the antiwear properties and the cutting efficiencies thereof, of an ester of tri-n-butylammonium acid malate and a primary, aliphatic, monohydric alcohol containing between about 12 carbon atoms and about 18 carbon atoms per molecule.

5. A mineral oil containing a minor amount, sufficient to improve the antiwear properties and the cutting efficiencies thereof, of the ester of tri-n-butylammonium acid malate and oleyl alcohol.

6. A mineral oil containing a minor amount, sufficient to improve the antiwear properties and the cutting efficiencies thereof, of the ester of tri-n-butylammonium acid malate and octadecanol-1.

7. A mineral oil containing a minor amount, sufficient to improve the antiwear properties and the cutting efficiencies thereof, of the ester of tri-n-butylammonium acid malate and hexadecanol-1.

8. A mineral oil containing a minor amount, sufficient to improve the antiwear properties and the cutting efficiencies thereof, of the ester of tri-n-butylammonium acid malate and dodecanol-1.

9. A mineral oil containing a minor amount, sufficient to improve the antiwear properties and the cutting efficiencies thereof, of an ester of a trialkylammonium acid salt of tartaric acid and a primary, aliphatic, monohydric alcohol containing between about 12 carbon atoms and about 18 carbon atoms per molecule; the alkyl radicals in the trialkylammonium group of said trialkylammonium salt containing up to six carbon atoms per radical.

10. A mineral oil containing a minor amount, sufficient to improve the antiwear properties and the cutting efficiencies thereof, of an ester of triamylammonium acid tartrate and a primary, aliphatic, monohydric alcohol containing between about 12 carbon atoms and about 18 carbon atoms per molecule.

11. A mineral oil containing a minor amount, sufficient to improve the antiwear properties and the cutting efficiencies thereof, of the ester of triamylammonium acid tartrate and oleyl alcohol.

HASTINGS S. TRIGG.
HENRY D. NORRIS
RALPH V. WHITE.

REFERENCES CITED

The following references are of record in the file of this patent:

UNITED STATES PATENTS

| Number | Name | Date |
| --- | --- | --- |
| 1,803,298 | Bannister | Apr. 28, 1931 |
| 2,370,299 | Farrington | Feb. 27, 1945 |
| 2,384,595 | Blair | Sept. 11, 1945 |
| 2,417,833 | Lincoln | Mar. 25, 1947 |
| 2,458,425 | Rocchini | Jan. 6, 1949 |
| 2,475,409 | Smith | July 5, 1949 |